United States Patent
Hou et al.

(10) Patent No.: US 8,583,134 B2
(45) Date of Patent: Nov. 12, 2013

(54) METHOD, SYSTEM AND TRANSMITTER FOR ADAPTIVE COORDINATED TRANSMISSION IN WIRELESS COMMUNICATIONS

(75) Inventors: Xiaolin Hou, Beijing (CN); Zhan Zhang, Beijing (CN); Hidetoshi Kayama, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 787 days.

(21) Appl. No.: 12/748,236

(22) Filed: Mar. 26, 2010

(65) Prior Publication Data
US 2010/0246524 A1 Sep. 30, 2010

(30) Foreign Application Priority Data
Mar. 31, 2009 (CN) .......................... 2009 1 0133605

(51) Int. Cl.
*H04W 72/00* (2009.01)

(52) U.S. Cl.
USPC ......... 455/452.2; 370/254; 370/329; 455/450

(58) Field of Classification Search
None
See application file for complete search history.

(56) References Cited

U.S. PATENT DOCUMENTS

| | | |
|---|---|---|
| 2004/0010429 A1* | 1/2004 | Vedula et al. ...................... 705/7 |
| 2008/0132262 A1 | 6/2008 | Jung et al. |
| 2010/0107028 A1* | 4/2010 | Gorokhov et al. ............ 714/748 |
| 2010/0197314 A1* | 8/2010 | Maaref et al. ................. 455/450 |
| 2012/0039419 A1* | 2/2012 | Maddah-Ali et al. ......... 375/340 |

OTHER PUBLICATIONS

European Search Report for corresponding European Patent Application No. 10156677.6, Jun. 16, 2010, 8 pgs.

* cited by examiner

*Primary Examiner* — Ian N Moore
*Assistant Examiner* — Jackie Zuniga
(74) *Attorney, Agent, or Firm* — Blakely, Sokoloff, Taylor & Zafman LLP (57) ABSTRACT

A method for adaptive coordinated transmission in wireless communications includes: determining more than one transmitter for performing coordinated transmission, configuring one of the more than one transmitter to be a serving transmitter with others of the more than one transmitter being cooperating transmitters, and determining more than one receiver; determining, by a cooperating transmitter, a cooperation mode according to measured signal parameters of the more than one receiver after receiving a cooperation request from the serving transmitter, and providing the cooperation mode to the serving transmitter; generating, by each of the more than one transmitter, a transmit signal corresponding to the more than one receiver according to the cooperation mode determined, and transmitting the transmit signal to each of the more than one receiver.

16 Claims, 3 Drawing Sheets

METHOD, SYSTEM AND TRANSMITTER FOR ADAPTIVE COORDINATED TRANSMISSION IN WIRELESS COMMUNICATIONS

PRIORITY

The present application claims priority to and incorporates by reference the entire contents of Chinese patent application, No. 200910133605.7, filed in China on Mar. 31, 2009.

FIELD OF THE INVENTION

The present invention relates to wireless communication techniques, and particularly to an adaptive coordinated transmission method, system and transmitter for evolved LTE downlink.

BACKGROUND OF THE INVENTION

Frequency multiplexing technique is generally used for increasing system capacity in a cellular communication system. In view of this, inter-cell interference (ICI) becomes a key factor affecting performances of the cellular communication system, especially for cell edge users. Multiple Input Multiple Output (MIMO) technique has become one of key techniques for B3G wireless communication systems including 3GPP Long Term Evolution (LTE) due to its capability of increasing spectrum efficiency of wireless links. However, the performance of MIMO is sensitive to ICI.

As the making of LTE Rel-8 standard drew to a close, the 3GPP started a research on LTE-A in the middle of year 2008. LTE-A is an evolution of LTE and requires better system performances (especially the spectrum efficiency for cell edge users). In order to increase the spectrum efficiency for cell edge users, LTE-A is considering using coordinated transmission technique to cope with the influences of ICI.

Current coordinated transmission technique includes several implementations, three most typical types of which are: fractional frequency reuse (FFR), single-user multi-eNB joint transmission and multi-user multi-eNB joint transmission with full cooperation.

Here, the FFR was described in technical proposals such as 3GPP R1-050507 and 3GPP R1-081873. The FFR may be fixed or dynamic, and it avoids adjacent cells to transmit data simultaneously using the same time-frequency resources in order to prevent cell edge users from being interfered. This scheme is simple in implementation, and does not require eNBs in adjacent cells to share data and Channel State Information at the Transmitter side (CSIT). Nevertheless, since transmission power of eNBs in adjacent cells is not fully utilized, the FFR will lower spectrum efficiency, especially when SNR is low.

The single-user multi-eNB joint transmission was described in technical proposals such as 3GPP R1-083870 and 3GPP R1-084173. According to this scheme, adjacent cells transmit data to a single user simultaneously using the same time-frequency resources in a specific manner, so that the ICI of conventional art can be converted into useful signals. It does not require eNBs from adjacent cells to share CSIT, either. However, this scheme may lead to lowered spectrum efficiency due to inefficient utilization of spatial Degree of Freedom (DoF) brought by multiple antennas of eNBs and users, especially when SNR is relatively high.

The multi-user multi-eNB joint transmission with full cooperation was described in technical proposals such as 3GPP R1-084482 and 3GPP R1-090601. This scheme is optimum in theory, which joins eNBs from multiple cells to form a larger scale transmitting antenna array for serving multiple users using the same time-frequency resources simultaneously. However, this scheme requires eNBs from adjacent cells to submit data and CSIT to a central node for joint processing, which is complex in implementation. Firstly, it will cause large backhaul signaling overhead and long processing delay. Secondly, the central node is highly complex in implementation.

SUMMARY OF THE INVENTION

In view of the foregoing, embodiments of the present invention include a method, system and transmitter for adaptive coordinated transmission in wireless communications.

In one embodiment of the present invention, a method for adaptive coordinated transmission in a wireless communication system includes: determining more than one receiver and more than one transmitter for performing coordinated transmission, setting one of the more than one transmitter as a serving transmitter, and setting others of the more than one transmitter as cooperating transmitters; receiving, by a cooperating transmitter, a cooperation request sent by the serving transmitter, determining a cooperation mode based on measured signal parameters of the more than one receiver, and providing the cooperation mode to the serving transmitter; and generating, by each transmitter, data stream corresponding to the more than one receiver according to the cooperation mode determined, and transmitting the data stream to each of the more than one receiver.

In another embodiment of the present invention, the system for adaptive coordinated transmission in wireless communications includes: more than one receiver and more than one transmitter for coordinated transmission, wherein one of the more than one transmitter is set to be a serving transmitter, and others of the more than one transmitter are set to be cooperating transmitters; wherein each of the cooperating transmitters is operable to receive a cooperation request sent by the serving transmitter, determine a cooperation mode based on measured signal parameters of the more than one receiver, and provide the cooperation mode to the serving transmitter; and each transmitter is operable to generate a transmit signal corresponding to the more than one receiver according to the cooperation mode determined, and transmit the transmit signal to each of the more than one receiver.

In yet another embodiment of the present invention, a transmitter includes: a cooperation mode determining unit, operable to determine a cooperation mode based on measured signal parameters of more than one receiver, and provide the cooperation mode to a second transmitter which initiates a cooperation request; and a transmit signal generating unit, operable to generate a transmit signal corresponding to the more than one receiver according to the cooperation mode determined, and send the transmit signal to each of the more than one receiver.

It can be seen from the above technical schemes that, a serving transmitter and one or more cooperating transmitters are distinguished in the method and system for adaptive coordinated transmission of the present invention. Further, the serving transmitter and the one or more cooperating transmitters may interact with each other to perform partial cooperation, thereby implementing MIMO coordinated transmission. In this way, the transmitters are not required to share C SIT, and the implementation complexity is low while the spectrum efficiency for cell edge users is increased.

In addition, different coordinated transmission techniques have different performances under different channel conditions. The method, system and transmitter put forward in the present invention may adaptively select a proper cooperation mode according to channel conditions to gain optimal performances. Further, when channel conditions change, the cooperation mode can be adjusted accordingly to maintain the performances of data transmission.

DETAILED DESCRIPTION OF THE INVENTION

Embodiments of the invention are hereinafter further described in detail with reference to the accompanying drawings as well as embodiments in order to make the objective, technical solution and merits thereof more apparent.

Figure 1:
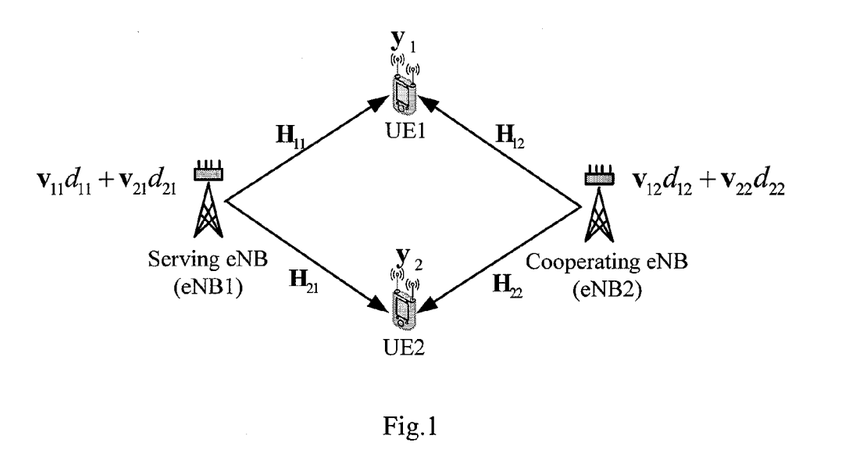
FIG. 1 is a schematic illustrating a multi-transmitter multi-receiver (MTMR) MIMO coordinated transmission system in accordance with an embodiment of the present invention.

A transmission system of an embodiment of the present invention is shown in FIG. 1. In this embodiment, the system has two transmitters and two receivers, wherein a transmitter is an eNB and a receiver is a user. One of the two eNBs is set to be a serving eNB (eNB1), the other being a cooperating eNB (eNB2). It is supposed that each eNB has 4 antennas, each user has 2 antennas, time divide duplex (TDD) mode is adopted, and wireless channels stay quasi static so that the eNBs may obtain ideal CSIT. In the MIMO coordinated transmission system shown in FIG. 1, signals received by the two users, i.e. UE1 and UE2, are as shown in formula (1):

$$y_1 = H_{11}(v_{11}d_{11} + v_{21}d_{21}) + H_{12}(v_{12}d_{12} + v_{22}d_{22}) + w_1$$

$$y_2 = H_{21}(v_{11}d_{11} + v_{21}d_{21}) + H_{22}(v_{12}d_{12} + v_{22}d_{22}) + w_2 \quad (1)$$

wherein $y_r$ is the signal received by the $r_{th}$ receiver (r=1,2), which is a vector with a dimension of 2×1.

$w_r$ is the noise of the $r_{th}$ receiver (r=1,2), which is a 2-by-1 vector.

$H_{rt}$ is a channel matrix (whose dimension is 2×4), and represents characteristics of a transmission channel from the $t_{th}$ transmitter to the $r_{th}$ receiver, where r=1, 2; t=1,2.

$v_{rt}$ is a beamforming parameter, and represents characteristics of a beamforming filter from the $t_{th}$ transmitter to the $r_{th}$ receiver, where r=1, 2; t=1,2. The beamforming parameter can be a 4-by-1 beamforming vector, or a beamforming matrix (whose dimension is 4×2).

$d_{rt}$ is a data stream from the $t_{th}$ transmitter to the $r_{th}$ receiver (r=1,2; t=1, 2), which is a scalar or a 2-by-1 vector.

When the noises of the receivers are not considered, i.e. $w_r$ is a null vector, formula (1) can be simplified into:

$$y_1 = H_{11}(v_{11}d_{11} + v_{21}d_{21}) + H_{12}(v_{12}d_{12} + v_{22}d_{22})$$

$$y_2 = H_{21}(v_{11}d_{11} + v_{21}d_{21}) + H_{22}(v_{12}d_{12} + v_{22}d_{22}) \quad (2)$$

It should be noted that, the technical scheme of the present invention can also be applied to other antenna configurations, e.g., each eNB has 8 antennas and each user has 2 antennas, or each eNB has 8 antennas and each user has 4 antennas. In addition, the transmitters should not be limited to eNBs, but can be other network nodes with transmitting capabilities (e.g., relay nodes, etc.). Still, the technical scheme of the present invention can also be applied to a frequency divide duplex (FDD) system. The only difference is: eNBs of the FDD system obtain CSIT in a manner different from that of a TDD system.

In a MTMR MIMO coordinated transmission system, the number of transmitters is no less than 2 (T≥2), and the number of receivers is also no less than 2 (R≥2). FIG. 1 illustrates the system taking T=2, R=2 merely as an example. In other situations, signals received can be calculated by reference to formula (1) or (2). For example, when T=2, R=3, signals received by users 1, 2 and 3 respectively following formula (2) are calculated as follows:

$$y_1 = H_{11}(v_{11}d_{11} + v_{21}d_{21} + v_{31}d_{31}) + H_{12}(v_{12}d_{12} + v_{22}d_{22} + v_{32}d_{32})$$

$$y_2 = H_{21}(v_{11}d_{11} + v_{21}d_{21} + v_{31}d_{31}) + H_{22}(v_{12}d_{12} + v_{22}d_{22} + v_{32}d_{32})$$

$$y_3 = H_{31} = (v_{11}d_{11} + v_{21}d_{21} + v_{31}d_{31}) + H_{32}(v_{12}d_{12} + v_{22}d_{22} + v_{32}d_{32})$$

It can be seen that, when the number of receivers is increased to R (where R≥2), referring to formula (1), the signal received by each receiver is:

$$y_r = H_{r1}\left(\sum_{r=1}^{R} v_{r1}d_{r1}\right) + H_{r2}\left(\sum_{r=1}^{R} v_{r2}d_{r2}\right) + w_r, \; r = 1, \ldots, R$$

Here, when the number of receiving antennas of the $r_{th}$ user is $n_r$, and the number of transmitting antennas of the $t_{th}$ eNB is $n_t$, the dimension of $H_{rt}$ is $n_r \times n_t$, the dimension of $v_{rt}$ is $n_t \times 1$ or $n_t \times n_r$, $d_{rt}$ is a scalar or a vector whose dimension is $n_r \times 1$, the dimension of $y_r$ is $n_r \times 1$, and the dimension of $w_r$ is $n_r \times 1$. Additionally, in order to enable the UEs to perform MIMO detection, formula (3) should be satisfied, i.e., the number of data streams received by each UE is smaller than or equal to the number of the antennas of the UE.

$$n_r \geq \text{Cardinality}(d_{r1}) + \text{Cardinality}(d_{r2}) \quad (3)$$

Figure 2:
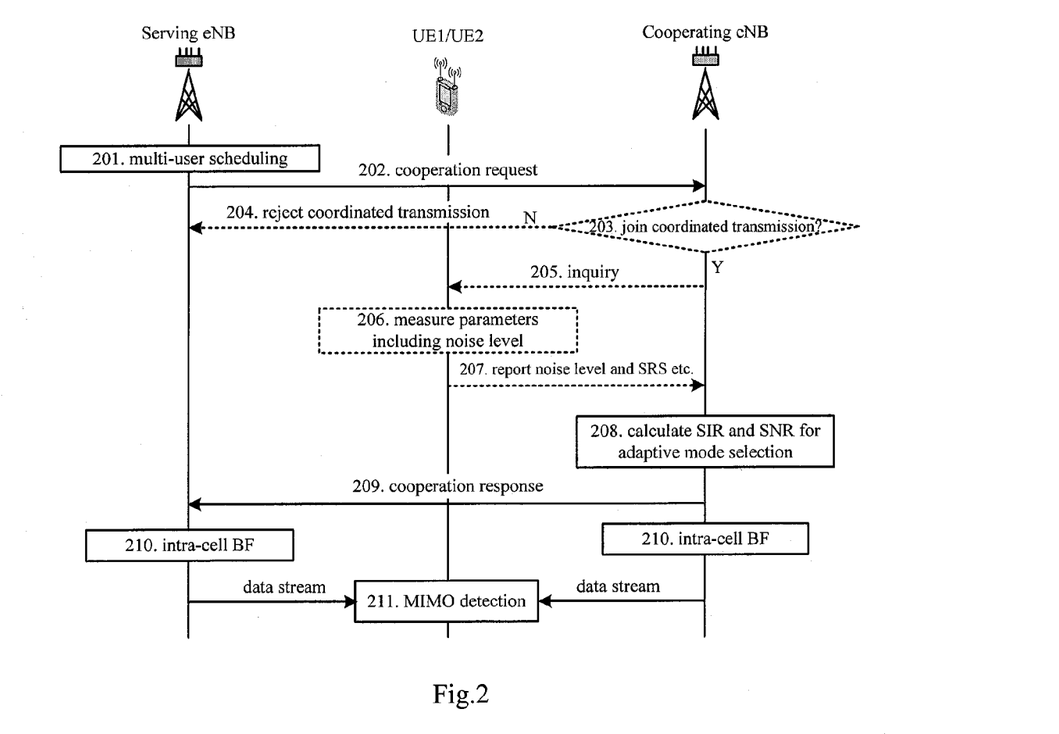
FIG. 2 is a flowchart illustrating a process of adaptive MIMO coordinated transmission in accordance with an embodiment of the present invention.

FIG. 2 is a flowchart illustrating a process of adaptive coordinated transmission in accordance with an embodiment of the present invention, which includes the steps as follows.

In step 200, two eNBs, i.e. eNB1 and eNB2, are determined for performing MIMO coordinated transmission, and one of the two eNBs is set to be a serving eNB while the other is a cooperating eNB.

Specifically, the serving eNB and the cooperating eNB can be set according to residential situations of cell edge users. For example, if a cell edge user resides in the coverage of eNB1, eNB1 is set to be the serving eNB.

In step 201, the serving eNB performs multi-user scheduling for cell edge users to simultaneously serve more than one user using a specified resource block (RB). In the embodiment, it is supposed that the serving eNB serves two uses, namely user 1 (UE1) and user 2 (UE2), simultaneously.

In this step, the multi-user scheduling may be implemented based on existing multi-user scheduling algorithms, and will not be described in detail herein.

In step 202, the serving eNB sends a cooperation request to the cooperating eNB.

In step 203, the cooperating eNB judges whether to join the coordinated transmission. If not, step 204 will be performed. If yes, step 205 will be performed.

Specifically, the cooperating eNB may make a decision on whether to join the coordinated transmission according to its own conditions, such as whether the cooperating eNB has appropriate time-frequency resources, whether the cooperating eNB supports coordinated transmission and so on.

In step 204, the cooperating eNB sends a response to the serving eNB, informing that the coordinated transmission is rejected, and the process will be ended.

In step 205, the cooperating eNB sends an inquiry command respectively to the two scheduled users.

In steps 206-207, a scheduled user receives the inquiry command, and submits measured signal parameters of the user to the cooperating eNB.

To be specific, the two scheduled users measure their noise power $\sigma^2$ respectively, and submit the noise power to the cooperating eNB.

The two scheduled users may further send uplink sounding reference signal (SRS) to the cooperating eNB, enabling the cooperating eNB to obtain CSIT.

In real practice, steps 205-207 are optional because a cell edge user may submit its parameters to multiple adjacent eNBs periodically.

In step 208, the cooperating eNB calculates SIR and SNR according to the measured signal parameters, and selects an adaptive cooperation mode based on the SIR and the SNR.

In step 209, the cooperating eNB informs the serving eNB of the adaptive cooperation mode selected through a cooperation response.

In step 210, the serving eNB and the cooperating eNB perform multi-user beamforming within their cells, respectively, for the two scheduled users using the specified RB according to a pre-determined beamforming manner, set a partial data stream $d_{rt}$ for each of the two scheduled users according to the cooperation mode selected, and generate a total transmit signal $D_t$; t=1, 2 corresponding to the serving eNB (t=1) or the cooperating eNB (t=2) based on formula $$D_t = \sum_{r=1}^{R} v_{rt} d_{rt}.$$

It should be noted that the cooperating eNB may calculate the SIR and the SNR periodically and re-select an adaptive cooperation mode based on the calculated SIR and SNR, so that the cooperation mode can be changed during a communication procedure. Therefore, the cooperating eNB should be capable of sending an inquiry command to a UE periodically to obtain the measured signal parameters including noise power and SRS; or alternatively, the UE should be capable of submitting noise power and SRS etc., periodically. When detecting a change in the cooperation mode, the cooperating eNB sends a cooperation mode changing signal to the serving eNB, requiring the serving eNB to change the cooperation mode. After the serving eNB receives the cooperation mode changing signal, the two eNBs transmit data using the new cooperation mode. Naturally, when wireless channels are quasi static, the cooperation mode may not be changed during the whole procedure of data transmission after being determined.

Specifically, one of the following algorithms may be used as the beamforming manner in step 210.

1. zero-forcing (ZF) algorithm. According to ZF algorithm, a specific $v_{rt}$ is selected so that interference of the $r_{th}$ receiver on other receivers can be completely eliminated at the $t_{th}$ transmitter side.

Taking the system model in FIG. 1 as an example, when selecting $v_{21}$, it is only required to randomly select a vector from null spaces of $H_{11}$, which makes $H_{11}$ and $v_{21}$ orthogonal to each other. To be specific, singular value decomposition is performed on $H_{11}$ to obtain $SVD(H_{11})=L_{11}\Sigma_{11}R_{11}^H$, where $L_{11}$ is a left singular matrix with a dimension of 2×2, $$\Sigma_{11} = \begin{bmatrix} \sigma_{11}^{(1)} & 0 & 0 & 0 \\ 0 & \sigma_{11}^{(2)} & 0 & 0 \end{bmatrix}$$

is a diagonal matrix with a dimension of 2×4 (which is the same as the dimension of $H_{11}$), $R_{11}=[r_{11}^{(1)}\ r_{11}^{(2)}\ r_{11}^{(3)}\ r_{11}^{(4)}]$ is a right singular matrix with a dimension of 4×4. Here, $\sigma_{11}^{(1)}$ and $\sigma_{11}^{(2)}$ are eigenvalues. Therefore, by making $v_{21}=r_{11}^{(3)}$ or $v_{21}=r_{11}^{(4)}$, the interference from UE2 on UE1 can be eliminated within the cell of eNB1. As for $v_{11}$, a vector, which makes $H_{21}$ and $v_{11}$ orthogonal with each other, needs to be selected from null spaces of $H_{21}$. Thus, the beamforming using ZF algorithm at the side of transmitter 1 (i.e. eNB1) is a process of singular value decomposing $H_{11}$ and $H_{21}$ to find $v_{21}$ and $v_{11}$.

It should be noted that, for ZF criteria, a condition of $$n_t \geq \sum_{r=1}^{R} n_r$$

should be satisfied when performing MTMR coordinated transmission.

2. Signal to leakage-plus-noise ratio (SLNR) algorithm. The SLNR algorithm maximizes the ratio of the useful signal power of the current user to the power of interference of the current user on the other users plus noise. The principle of this algorithm has been given in the prior art, and will not be described further herein.

Referring to the system model of FIG. 1, taking the selection of $v_{21}$ as an example, $v_{21}=\text{max\_eigenvector}((\sigma^2 I + H_{11}^H H_{11})^{-1} H_{21}^H H_{21})$ is determined according to the SLNR algorithm. That is, an eigenvector corresponding to the largest eigenvalue of the given matrix is selected as the beamforming vector.

3. ZF with local optimization. This algorithm is an improvement for the ZF algorithm. Since MIMO technique may increase space DoF, the transmitter side tries to transmit data in a direction which is closest to the eigen-direction of a wireless channel of the current user while eliminating the interference of the current user on the other users. In this way, the power of effective transmit signals can be increased.

Taking the $r_{th}$ receiver as an example, more than one channel eigen-direction vector of $H_{rt}$ is projected to null spaces of the space channel matrix of the $t_{th}$ transmitter to the other receivers. If the number of receivers is two, for one of the receivers (say Receiver 1), it is to project channel eigen-direction vectors of $H_{1t}$ to the null spaces of the space channel matrix of the $t_{th}$ transmitter to Receiver 2. If the number of receivers is larger than two, a joint space channel matrix of the $t_{th}$ transmitter to all the other receivers can be obtained, and it is to the null spaces of the joint space channel matrix that the channel eigen-direction vectors of $H_{1t}$ are projected. Then, projections of the channel eigen-direction vectors are weighed using corresponding eigenvalues to obtain weighed values, and the projection that has the largest weighed value is selected from the projections of the channel eigen-direction vectors. At last, the beamforming parameter $v_{rt}$ is determined based on the selected projection of the channel eigen-direction vector. Specifically, the projection, which has the largest weighed value, is normalized and then used as the beamforming parameter $v_{rt}$.

Referring to the system model of FIG. 1, the ZF with local optimization will be described further by taking the selection of $v_{21}$ as an example. The detailed process of selecting $v_{21}$ is as follows.

(1) Perform Singular value decomposition on $H_{21}$ and obtain $SVD(H_{21}) = L_{21}\Sigma_{21}R_{21}^H$.

(2) Project $r_{21}^{(1)}$ and $r_{21}^{(2)}$ to null spaces of $H_{11}$ respectively so that interferences of the current user on the other users are completely eliminated, weigh the vectors using corresponding singular values, and select a vector which has the largest weighed value from the vectors, where the superscript of the selected vector is $$i = \underset{i=1,2}{\operatorname{argmax}}\{\sigma_{21}^{(i)} \cdot ([r_{21}^{(i)}]^H \cdot r_{11}^{(3)} + [r_{21}^{(i)}]^H \cdot r_{11}^{(4)})\}.$$

(3) Obtain $v_{21}$ according to formula $v_{21} = \mu \cdot [\alpha r_{11}^{(3)} + \beta r_{11}^{(4)}]$, where $\alpha = ([r_{21}^{(i)}]^H \cdot r_{11}^{(3)})^{1/2}$, $\beta = ([r_{21}^{(i)}]^H \cdot r_{11}^{(4)})^{1/2}$, and the normalizing factor $$\mu = \left(\frac{1}{[r_{21}^{(i)}]^H \cdot r_{11}^{(3)} + [r_{21}^{(i)}]^H \cdot r_{11}^{(4)}}\right)^{1/2}.$$

It should be noted that in step 210, the serving eNB and the cooperating eNB may adopt any multi-user beamforming algorithm, whatever an existing algorithm or an improved one. When the implementation complexity is taken into account, linear beamforming manners (such as ZF and SLNR etc.) are more suitable for practical implementation, and thus may be a preferred choice in real practice. In addition, the serving eNB and the cooperating eNB may adopt different beamforming manners, but it is easier to be implemented when the same beamforming manner is adopted.

In step 211, each scheduled user (i.e. UE1 or UE2) receives data streams from the two cells respectively on the given RB, and recovers data using existing MIMO detection techniques. Then, the process is ended.

It should be noted that, the process of the cooperating eNB judging whether to join the coordinated transmission initiated by the serving eNB in steps 203 and 204 is optional. That is, after receiving the cooperation request, the cooperating eNB may directly perform step 205 to send an inquiry command to each scheduled user, or directly perform step 208, without judging whether to join the coordinated transmission.

In the process shown in FIG. 2, details of step 208 are as follows.

(1) Calculate respective SNR of the two scheduled users and SIR between the two scheduled users. To be specific, $$SIR = \frac{\|H_{12}v_{12}\|^2}{\|H_{12}v_{22}\|^2} \text{ and } SNR = \frac{1}{\sigma^2}.$$

The SNR is calculated based on normalized power of each eNB, i.e., the SNR is calculated by supposing the transmission power of each eNB as 1. Generally, the scheduled users have similar SNR, so the SNR for different scheduled users need not be differentiated.

(2) Determine the cooperation mode to be adopted based on a pre-set SIR threshold and SNR thresholds.

The cooperation modes provided in the present invention include: Dynamic FFR, single-user multi-eNB spatial multiplexing (JT-SU), Multi-Tx Multi-Rx macro-diversity (MTMR MD), and Multi-Tx Multi-Rx spatial multiplexing (MTMR SM).

In one embodiment of the present invention, modes A, B and C are set for selection, which are shown in Table 1.

TABLE 1

| | Different cooperation modes | |
|---|---|---|
| | ZF | SLNR |
| A | Dynamic FFR | |
| B | JT-SU SM | JT-SU SM |
| | | MTMR MD |
| C | MTMR SM | |

Differences among those cooperation modes mainly lie in different allocation of $d_{rt}$. Here, dynamic FFR and JT-SU are prior art. In real practice, d12=d22=0 for Dynamic FFR, and d21=d22=0 for JT-SU. That is to say, Dynamic FFR simplifies MTMR to STMR while JT-SU simplifies MTMR to MTSR. In MTMR MD, the allocation of $d_{rt}$ is: d11=d12 and d21=d22 (i.e. dr1 and dr2 are set to be the same). In MTMR SM, the allocation of $d_{rt}$ is: setting dr1 and dr2 to be different.

Figure 3:
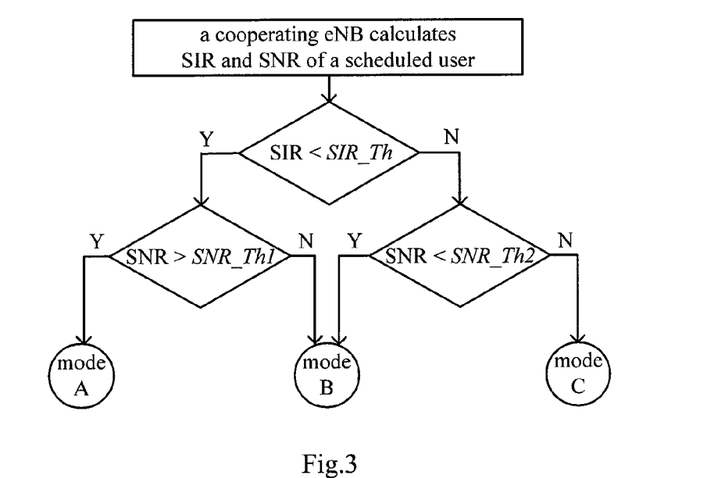
FIG. 3 is a flowchart illustrating a process of adaptive cooperation mode selection in accordance with an embodiment of the present invention.

It can be seen from FIG. 3 that, mode A is suitable for a situation where the SIR calculated is lower than an SIR threshold (i.e. SIR_Th) and the SNR calculated is higher than the first SNR threshold (i.e. SNR_Th1), i.e., SIR<SIR_Th and SNR>SNR_Th1; mode C is suitable for a situation where the SIR calculated is higher than the SIR threshold (SIR_Th) and the SNR calculated is higher than the second SNR threshold (SNR_Th2), i.e., SIR≥SIR_Th and SNR≥SNR_Th2; mode B is suitable for two situations where SIR<SIR_Th and SNR≤SNR_Th1, or SIR≥SIR_Th and SNR<SNR_Th2. For critical points, mode selection is more flexible. For example, as to a critical point where SIR=SIR_Th and SNR=SNR_Th1, either mode A or mode B is usable. For another example, as to a critical point where SIR=SIR_Th and SNR=SNR_Th2, mode C or mode B can be adopted. Additionally, the SNR for judging the mode may be calculated based on measured signal parameters of user 1, or based on measured signal parameters of user 2, or based on an average value of the measured signal parameters of user 1 and user 2. It can be seen from Table 1 that, the cooperation mode adopted may be related with the beamforming manner adopted by eNBs. For example, if the beamforming manner is ZF, the cooperation mode B is JT-SU SM; if the beamforming manner is SLNR, the cooperation mode B may be JT-SU SM or MTMR MD. Furthermore, for different beamforming manners, values of the SIR threshold and the SNR thresholds may be different, and the values may be determined according to simulation and test data.

In the embodiment shown in FIG. 2, the number of transmitters (referred to as T) is 2. Furthermore, transmitters adopted for coordinated data transmission can be more than two. In this case, when multiple cooperating eNBs return different cooperation modes, the serving eNB may select one from the cooperation modes as the cooperation mode to be adopted by the serving eNB. Different cooperating eNBs can be allowed to adopt different cooperation modes; or the serving eNB may inform all the cooperating eNBs of the cooperation mode selected, and request all the cooperating eNBs to adopt the selected cooperation mode.

Furthermore, an embodiment of the present invention also provides an adaptive coordinated transmission system for wireless communications. The system may include: more than one transmitter and more than one receiver for performing coordinated transmission.

One of the transmitters is set to be a serving transmitter, and the other transmitters are set to be cooperating transmitters. A cooperating transmitter is used for receiving a cooperation request sent by the serving transmitter, determining a cooperation mode based on measured signal parameters of the more than one receiver, and providing the cooperation mode for the serving transmitter.

After the cooperation mode is determined, each transmitter (including cooperating transmitters and serving transmitter) may generate a total transmit signal corresponding to the more than one receiver according to the cooperation mode, and send the total transmit signal to each receiver.

To be specific, the cooperating transmitter is operable to: calculate signal to interference ratio (SIR) and signal to noise ratio (SNR) among the more than one receiver according to the measured signal parameters, select a cooperation mode according to relationship between the SIR calculated and a SIR threshold and according to relationship between the SNR calculated and SNR thresholds.

Specifically, each transmitter is operable to: determine a beamforming manner, set a beamforming parameter $v_{rt}$ for each receiver according to the beamforming manner, set a partial data stream $d_{rt}$ for each receiver according to the cooperation mode selected, and generate a total transmit signal $D_t$ corresponding to the more than one receiver according to formula $$D_t = \sum_{r=1}^{R} v_{rt} d_{rt}.$$

The beamforming parameter $v_{rt}$ represents the characteristics of a beamforming filter from the $t_{th}$ transmitter to the $r_{th}$ receiver; the partial data stream $d_{rt}$ is the data stream from the $t_{th}$ transmitter to the $r_{th}$ receiver; wherein r=1, . . . , R; t=1, . . . , T, T is the number of transmitters in the coordinated transmission, R is the number of receivers in the coordinated transmission.

Further, the cooperation mode selected may be related with the beamforming manner. For example, if the beamforming manner is ZF, the cooperation mode B will be JT-SU SM; if the beamforming manner is SLNR, the cooperation mode B may be JT-SU SM or MTMR MD.

Specifically, the cooperating transmitter is operable to: select a FFR mode when the SIR calculated is smaller than a SIR threshold and the SNR calculated is larger than a first SNR threshold; select a multi-user multi-eNB spatial multiplexing mode when the SIR calculated is not smaller than a SIR threshold and the SNR calculated is no smaller than a second SNR threshold; and select a single-user multi-eNB spatial multiplexing mode or a multi-user multi-eNB macro diversity mode in other situations (i.e., when SIR<SIR_Th and SNR≤SNR_Th1).

In the above multi-user multi-eNB macro diversity mode, the partial data stream $d_{rt}$, t=1, . . . , T of each transmitter to the $r_{th}$ receiver is the same, i.e. $d_{r1}=d_{r2}= \ldots =d_{rT}$. In the above multi-user multi-eNB spatial multiplexing mode, each transmitter has a different partial data stream $d_{rt}$, t=1, . . . , T to the $r_{th}$ receiver, e.g., data for the $r_{th}$ receiver can be randomly divided into T parts, and each transmitter transmits one of the T parts.

The cooperating transmitter is further operable to: judge whether to join the coordinated transmission after receiving a cooperation request, and determine a cooperation mode if the cooperating transmitter is to join the coordinated transmission; or send a cooperation rejected message to the serving transmitter if the cooperating transmitter is not to join the coordinated transmission.

The receiver is further operable to: receive a signal $y_r$, and recover data via MIMO detection.

Here, $$y_r = \sum_{t=1}^{T} \left[ H_{rt} \left( \sum_{r=1}^{R} v_{rt} d_{rt} \right) \right] + w_r; r = 1, \ldots, R; t = 1, \ldots, T,$$

wherein $H_{rt}$ is a matrix whose dimension is $n_r \times n_t$, $v_{rt}$ is a vector whose dimension is $n_t \times 1$ or a matrix whose dimension is $n_t \times n_r$, $d_{rt}$ is a scalar quantity or a vector whose dimension is $n_r \times 1$, $y_r$ is a vector whose dimension is $n_r \times 1$, $w_r$ is a vector whose dimension is $n_r \times 1$; the number of antennas of the $r_{th}$ receiver is $n_r$, the number of antennas of the $t_{th}$ transmitter is $n_t$.

In an embodiment of the present invention, each transmitter or each receiver has multiple antennas, so each receiver may use MIMO detection for recovering data.

Furthermore, an embodiment of the present invention also provides a transmitter for cooperating with other transmitters in transmitting user data. The transmitter includes: a cooperation mode determining unit and a transmit signal generating unit.

The cooperation mode determining unit is operable to determine a cooperation mode based on measured signal parameters of more than one receiver, and provide the cooperation mode to a second transmitter which initiates a cooperation request. The second transmitter which initiates the cooperation request is a serving transmitter.

The transmit signal generating unit is operable to generate a total transmit signal corresponding to the more than one receiver according to the cooperation mode determined, and send the total transmit signal to each of the more than one receiver.

Specifically, the transmit signal generating unit is operable to: determine a beamforming manner, set a beamforming parameter $v_{rt}$ for each receiver according to the beamforming manner determined, set a partial data stream $d_{rt}$ for each receiver according to the cooperation mode selected, and generate a total transmit signal $D_t$ corresponding to the more than one receiver according to Formula $$D_t = \sum_{r=1}^{R} v_{rt} d_{rt}.$$

It can be seen that the data transmitted by a transmitter may include data for multiple receivers. Likewise, the data received by a receiver is transmitted by multiple transmitters.

The beamforming parameter $v_{rt}$ represents the characteristics of a beamforming filter from the $t_{th}$ transmitter to the $r_{th}$ receiver; the partial data stream $d_{rt}$ is the data stream from the $t_{th}$ transmitter to the $r_{th}$ receiver; wherein r=1, ..., R; t=1, ..., T, and T is the number of transmitters, R is the number of receivers.

Specifically, the cooperation mode determining unit is operable to: select a FFR mode when the SIR calculated is smaller than a SIR threshold and the SNR calculated is larger than a first SNR threshold; select a multi-user multi-eNB spatial multiplexing mode when the SIR calculated is not smaller than the SIR threshold and the SNR calculated is not smaller than a second SNR threshold; and select a single-user multi-eNB spatial multiplexing mode or a multi-user multi-eNB macro diversity mode in other situations.

According to the multi-user multi-eNB macro diversity mode, each transmitter is configured to transmit the same partial data stream $d_{rt}$=1, ..., T to the $r_{th}$ receiver. According to the multi-user multi-eNB spatial multiplexing mode, each transmitter is configured to transmit a different partial data stream $d_{rt}$, t=1, ..., T to the $r_{th}$ receiver.

The transmitter is further operable to: judge whether to join the coordinated transmission after receiving a cooperation request, and determine a cooperation mode if the transmitter is to join the coordinated transmission; or send a cooperation rejected message to the second transmitter if the transmitter is not to join the coordinated transmission.

In order to visually present performances of the technical scheme provided in the present invention, the adaptive coordinated transmission is simulated according to the parameters shown in Table 2 for different cooperation modes and different beamforming manners. It should be noted that a resource block is taken as a unit of beamforming, i.e., an average channel gain of each resource block is used in beamforming.

TABLE 2

| Simulation parameters | |
| --- | --- |
| Carrier frequency | 2 GHz |
| Bandwidth | 10 MHz |
| FFT size | 1024 |
| Usable subcarrier number | 600 |
| Cyclic prefix | 72 |
| RB number | 6 |
| MTMR MIMO configuration | (4, 4, 2, 2) |
| MCS | QPSK, Turbo, 1/2 |
| MIMO detection | MMSE |
| Channel estimation | Ideal |
| Channel model | SCM |
| Mobile speed | 3 km/h |

It should be noted that the simulation is on link-level and it is supposed that the current serving cell has finished multi-user scheduling, so only the influences of the SNR and the change of SIR in a cooperating cell on the performances should be taken into account. Therefore, in the simulation, wireless channels of the two users always stay independent in the serving cell, while being hybrid channels with alternate high-low SIR in the cooperating cell.

In addition, thresholds for controlling the selection of adaptive cooperation mode are experience data obtained from simulation, and can be optimized according to different system parameters and simulation/practical measurement. Table 3 gives a set of values for reference.

TABLE 3

| Thresholds used in simulation for selecting adaptive cooperation mode | | |
| --- | --- | --- |
|  | ZF | SLNR |
| SIR_Th (dB) | 18 | 13 |
| SNR_Th1 (dB) | 10 | 8 |
| SNR_Th2 (dB) | 6 | 3 |

Figure 4:
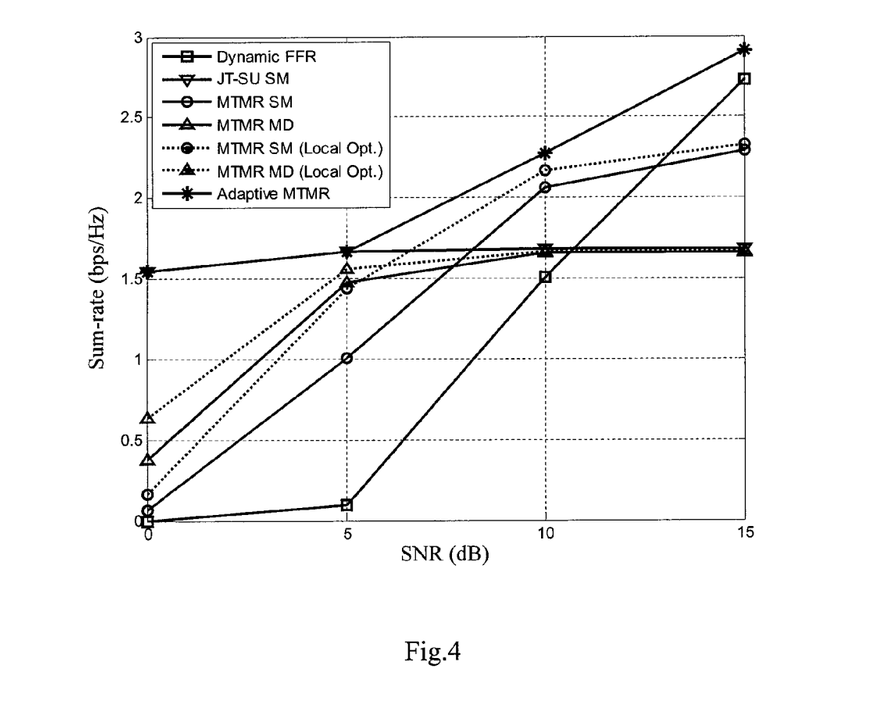
FIG. 4 is a schematic illustrating a comparison of sum-rates of different cooperation modes under ZF criteria in accordance with an embodiment of the present invention.

FIG. 4 shows performance curves of seven cooperation modes when using ZF criteria in beamforming, where the horizontal axis represents signal-to-noise ratio, and the vertical axis represents sum-rate. The seven cooperation modes are: Dynamic FFR, shown by a curve in solid line with panes; JT-SU SM, shown by a curve in solid line with inverted triangles; MTMR SM, shown by a curve in solid line with circles; MTMR MD, shown by a curve in solid line with triangles; MTMR SM with local optimization ZF (MTMR SM local Opt.), shown by a curve in dotted line with circles; MTMR MD with local optimization ZF (MTMR MD local Opt.), shown by a curve in dotted line with triangles; Adaptive MTMR, shown by a curve in solid line with asterisks (i.e. *).

Figure 5:
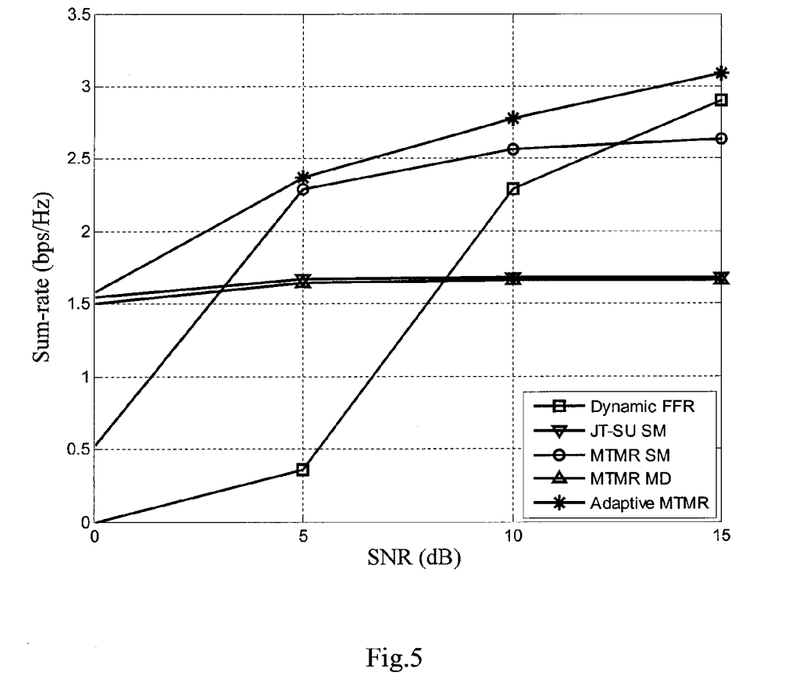
FIG. 5 is a schematic illustrating a comparison of sum-rates of different cooperation modes under SLNR criteria in accordance with an embodiment of the present invention.

FIG. 5 shows performance curves of five cooperation modes when using SLNR criteria in beamforming, where the horizontal axis represents SNR, and the vertical axis represents sum-rate. The five cooperation modes are: Dynamic FFR, shown by a curve in solid line with panes; JT-SU SM, shown by a curve in solid line with inverted triangles; MTMR SM, shown by a curve in solid line with circles; MTMR MD, shown by a curve in solid line with triangles; Adaptive MTMR, shown by a curve in solid line with asterisks (i.e. *).

From the simulation results shown in FIGS. 4 and 5, it can be seen that:

1. Multiple cooperation modes can be supported simultaneously within the same framework, and the cooperation mode determined in an adaptive manner could always provide the best performances. The adaptive manner refers to determining a cooperation mode according to channel conditions (e.g. SIR and SNR) of a receiver, where the SIR and SNR embody the characteristics of $H_{rt}$ and $w_r$.
2. The ZF beamforming with local optimization outperforms the ZF beamforming.
3. The SLNR beamforming outperforms the ZF beamforming.

The foregoing is only preferred embodiments of the present invention and is not for use in limiting the present invention. Any modification, equivalent replacement or improvement made under the spirit and principles of the present invention is included in the protection scope thereof.

The invention claimed is:

1. A method for adaptive coordinated transmission in a wireless communication system, wherein the wireless communication system comprises more than one receiver and more than one transmitter for performing coordinated transmission, one of the more than one transmitter is set as a serving transmitter, and others of the more than one transmitter are set as cooperating transmitters, the method comprising:

receiving, by a cooperating transmitter, a cooperation request sent by the serving transmitter, determining, by the cooperating transmitter, a cooperation mode based on measured signal parameters of the more than one receiver after receiving the cooperation request sent by the serving transmitter, and providing, by the cooperating transmitter, the cooperation mode to the serving transmitter;

generating, by each transmitter, data stream corresponding to the more than one receiver according to the cooperation mode determined, and transmitting the data stream to each of the more than one receiver;

wherein determining a cooperation mode comprises calculating, by each of the cooperating transmitters, signal to interference ratio (SIR) and signal to noise ratio (SNR) according to the measured signal parameters, and selecting the cooperation mode according to a relationship between the SIR calculated and a SIR threshold and according to a relationship between the SNR calculated and a SNR threshold;

wherein selecting the cooperation mode according to the relationship between the SIR calculated and the SIR threshold and according to the relationship between the SNR calculated and the SNR threshold comprises when the SIR calculated is smaller than the SIR threshold and the SNR calculated is larger than a first SNR threshold, selecting a dynamic fractional frequency reuse (FFR) mode, when the SIR calculated is not smaller than the SIR threshold and the SNR calculated is not smaller than a second SNR threshold, selecting a multi-user multi-eNB spatial multiplexing mode, wherein a partial data stream from each transmitter to the receiver is different from each other in the multi-user multi-eNB spatial multiplexing mode, and otherwise, selecting a single-user multi-eNB spatial multiplexing mode or a multi-user multi-eNB macro diversity mode, wherein a partial data stream from each transmitter to the receiver is set to be the same in the multi-user multi-eNB macro diversity mode.

2. The method of claim 1, wherein determining more than one receiver comprises: performing, by the serving transmitter, multi-user scheduling for cell edge users, and selecting the more than one receiver from the cell edge users.

3. The method of claim 1, wherein generating a data stream corresponding to the more than one receiver comprises:

determining, by each transmitter, a beamforming manner;
setting a beamforming parameter $v_{rt}$ for each receiver according to the beamforming manner;
setting a partial data stream $d_{rt}$ for each receiver according to the cooperation mode selected; and
generating a total transmit signal $D_t$ corresponding to the more than one receiver according to formula $$D_t = \sum_{r=1}^{R} v_{rt} d_{rt};$$

wherein the beamforming parameter $v_{rt}$ represents characteristics of a beamforming filter from the $t_{th}$ transmitter to the $r_{th}$ receiver;

the partial data stream $d_{rt}$ is a data stream from the $t_{th}$ transmitter to the $r_{th}$ receiver; and r=1, . . . , R; t=1, . . . , T; wherein T is the number of transmitters, and R is the number of receivers.

4. The method of claim 3, wherein the beamforming manner is: a zero-forcing (ZF) algorithm, or a signal to leakage-plus-noise ratio (SLNR) algorithm.

5. The method of claim 3, wherein setting by each transmitter a corresponding beamforming parameter $v_{rt}$ for each receiver based on the beamforming manner determined comprises:

for the $r_{th}$ receiver, projecting more than one channel eigen-direction vector of $H_{rt}$ to null spaces of space channel matrixes of the $t_{th}$ transmitter to other receivers except the $r_{th}$ receiver;

weighing the projection of each channel eigen-direction vector using a corresponding eigenvalue to obtain a weighed value of the projection of the channel eigen-direction vector;

selecting a projection of an channel eigen-direction vector which has the largest weighed value; and determining the beamforming parameter $v_{rt}$ based on the selected projection of the channel eigen-direction vector;

wherein $H_{rt}$ represents characteristics of a transmit channel from the $t_{th}$ transmitter to the $r_{th}$ receiver.

6. The method of claim 1, further comprising:

judging, by each of the cooperating transmitters, whether to join the coordinated transmission after receiving a cooperation request; and determining a cooperation mode if the cooperating transmitter is to join the coordinated transmission; or sending a message for rejecting the coordinated transmission to the serving transmitter if the cooperating transmitter is not to join the coordinated transmission.

7. The method of claim 1, further comprising: sending by the cooperating transmitter an inquiry command to each receiver, and sending by each receiver the measured signal parameters of the receiver to the cooperating transmitter; or submitting, by each receiver, the measured signal parameters of the receiver to the cooperating transmitter, periodically.

8. The method of claim 1, further comprising: receiving by the $r_{th}$ receiver a signal $y_r$, and recovering data using Multi-Input Multi-Output (MIMO) detection;

wherein $$y_r = \sum_{t=1}^{T} \left[ H_{rt} \left( \sum_{r=1}^{R} v_{rt} d_{rt} \right) \right] + w_r; r = 1, \ldots, R; t = 1, \ldots, T;$$

$H_{rt}$ whose dimension is $n_r \times n_t$, represents characteristics of a transmit channel from the $t_{th}$ transmitter to the $r_{th}$ receiver;

$v_{rt}$, whose dimension is $n_t \times 1$ or $n_t \times n_t$, represents characteristics of a beamforming filter from the $t_{th}$ transmitter to the $r_{th}$ receiver;

$d_{rt}$, which is a scalar or a $n_t \times 1$ vector, is a data stream from the $t_{th}$ transmitter to the $r_{th}$ receiver;

$w_r$, whose dimension is $n_r \times 1$, is the noise of the $r_{th}$ receiver;

$y_r$, whose dimension is $n_r \times 1$, is the received signal of the $r_{th}$ receiver; and $n_r$ is the number of antennas of the $r_{th}$ receiver, $n_t$ is the number of antennas of the $t_{th}$ transmitter.

9. The method of claim 1, wherein the transmitter is an eNB or a relay node.

10. A system for adaptive coordinated transmission in wireless communications, comprising:

more than one receiver and more than one transmitter for coordinated transmission, wherein one of the more than one transmitter is set to be a serving transmitter, and others of the more than one transmitter are set to be cooperating transmitters;

wherein each of the cooperating transmitters is adapted to receive a cooperation request sent by the serving transmitter, determine a cooperation mode based on measured signal parameters of the more than one receiver after receiving the cooperation request sent by the serving transmitter, and provide the cooperation mode to the serving transmitter; and each transmitter is adapted to generate a transmit signal corresponding to the more than one receiver according to the cooperation mode determined, and transmit the transmit signal to each of the more than one receiver;

wherein each of the cooperating transmitters is adapted to:

calculate signal to interference ratio (SIR) and signal to noise ratio (SNR) according to the measured signal parameters, and select a cooperation mode according to a relationship between the SIR calculated and at least one SIR threshold and according to a relationship between the SNR calculated and at least one SNR threshold;

wherein the cooperating transmitter is adapted to:

select a fractional frequency reuse (FFR) mode when the SIR calculated is smaller than the SIR threshold and the SNR calculated is larger than a first SNR threshold, select a multi-user multi-eNB spatial multiplexing mode when the SIR calculated is not smaller than the SIR threshold and the SNR calculated is not smaller than a second SNR threshold, and select a single-user multi-eNB spatial multiplexing mode or a multi-user multi-eNB macro diversity mode in other situations; and wherein a partial data stream from each transmitter to the receiver is set to be the same in the multi-user multi-eNB macro diversity mode, and a partial data stream from each transmitter to the receiver is set to be different in the multi-user multi-eNB spatial multiplexing mode.

11. The system of claim 10, wherein each transmitter is adapted to:

determine a beamforming manner;

set a beamforming parameter $v_{rt}$ for each receiver according to the beamforming manner determined;

set a partial data stream $d_{rt}$ for each receiver according to the cooperation mode selected; and generate the transmit signal $D_t$ corresponding to the more than one receiver according to formula $$D_t = \sum_{r=1}^{R} v_{rt} d_{rt}.$$

wherein the beamforming parameter $v_{rt}$ represents characteristics of a beamforming filter from the $t_{th}$ transmitter to the $r_{th}$ receiver;

the partial data stream $d_{rt}$ is a data stream from the $t_{th}$ transmitter to the $r_{th}$ receiver; and r=1, ..., R; t=1, ..., T; wherein T is the number of transmitters, and R is the number of receivers.

12. The system of claim 10, wherein the cooperating transmitter is further adapted to:

judge whether to join the coordinated transmission after receiving a cooperation request; and determine a cooperation mode if the cooperating transmitter is to join the coordinated transmission, or send a message for rejecting the coordinated transmission to the serving transmitter if the cooperating transmitter is not to join the coordinated transmission.

13. The system of claim 10, wherein the receiver is further adapted to: receive a signal $y_r$, and recover data using Multi-Input Multi-Output (MIMO) detection;

wherein $$y_r = \sum_{t=1}^{T} \left[ H_{rt} \left( \sum_{r=1}^{R} v_{rt} d_{rt} \right) \right] + w_r; r = 1, \ldots, R; t = 1, \ldots, T;$$

$H_{rt}$, whose dimension is $n_r \times n_t$, represents characteristics of a transmit channel from the $t_{th}$ transmitter to the $r_{th}$ receiver;

$v_{rt}$, whose dimension is $n_t \times 1$ or $n_t \times n_r$, represents characteristics of a beamforming filter from the $t_{th}$ transmitter to the $r_{th}$ receiver;

$d_{rt}$, which is a scalar or a vector whose dimension is $n_r \times 1$, is a data stream from the $t_{th}$ transmitter to the $r_{th}$ receiver;

$w_r$, whose dimension is $n_r \times 1$, is the noise of the $r_{th}$ receiver;

$y_r$, whose dimension is $n_r \times 1$, is the received signal of the $r_{th}$ receiver; and $n_r$ is the number of antennas of the $r_{th}$ receiver, and $n_t$ is the number of antennas of the $t_{th}$ transmitter.

14. A cooperating transmitter for adaptive coordinated transmission in a wireless communication system, wherein the wireless communication system further comprises a serving transmitter and more than one receiver, the cooperating transmitter is configured to implement a method comprising:

receiving a cooperation request sent by the serving transmitter, determining a cooperation mode based on measured signal parameters of the more than one receiver after receiving the cooperation request sent by the serving transmitter, and providing the cooperation mode to the serving transmitter; and generating a transmit signal corresponding to the more than one receiver according to the cooperation mode determined, and sending the transmit signal to each of the more than one receiver;

wherein the transmitter is further configured to implement a method comprising:

selecting a fractional frequency reuse (FFR) mode when a Signal to Interference Ratio (SIR) calculated by the cooperating transmitter is smaller than a SIR threshold and an Signal to Noise Ration (SNR) calculated by the cooperating transmitter is larger than a first SNR threshold, selecting a multi-user multi-eNB spatial multiplexing mode when the SIR calculated by the cooperating transmitter is not smaller than the SIR threshold and the SNR calculated by the cooperating transmitter is not smaller than a second SNR threshold, and selecting a single-user multi-eNB spatial multiplexing mode or a multi-user multi-eNB macro diversity mode in other situations; and wherein a partial data stream $d_{rt}$, t=1, ..., T from each transmitter to the $r_{th}$ receiver is set to be the same in the multi-user multi-eNB macro diversity mode, and the partial data stream $d_{rt}$, t=1, ..., T from each transmitter to the $r_{th}$ receiver is set to be different in the multi-user multi-eNB spatial multiplexing mode.

15. The cooperating transmitter of claim 14, wherein the transmitter is further configured to implement a method comprising:

judging whether to join the coordinated transmission after receiving the cooperation request; and determining a cooperation mode if the transmitter is to join the coordinated transmission, or sending a message for rejecting the coordinated transmission to the serving transmitter if the transmitter is not to join the coordinated transmission.

16. The cooperating transmitter of claim 14, wherein the transmitter is further configured to implement a method comprising:
   determining a beamforming manner;
   setting a beamforming parameter $v_{rt}$ for each receiver according to the beamforming manner determined;
   setting a partial data stream $d_{rt}$ for each receiver according to the cooperation mode selected; and
   generating the transmit signal $D_t$ corresponding to the more than one receiver according to formula $$D_t = \sum_{r=1}^{R} v_{rt} d_{rt};$$

wherein the beamforming parameter $v_{rt}$ represents characteristics of a beamforming filter from the $t_{th}$ transmitter to the $r_{th}$ receiver;
   the partial data stream $d_{rt}$ is a data stream from the $t_{th}$ transmitter to the $r_{th}$ receiver; and
   r=1, . . . , R; t=1, . . . , T; wherein T is the number of transmitters, and R is the number of receivers.

* * * * *